(12) United States Patent
Wu et al.

(10) Patent No.: US 11,949,511 B2
(45) Date of Patent: Apr. 2, 2024

(54) METHOD AND DEVICE IN A NODE USED FOR WIRELESS COMMUNICATION

(71) Applicants: Lu Wu, Shanghai (CN); Xiaobo Zhang, Shanghai (CN)

(72) Inventors: Lu Wu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 436 days.

(21) Appl. No.: 17/386,564

(22) Filed: Jul. 28, 2021

(65) Prior Publication Data

US 2021/0359792 A1    Nov. 18, 2021

Related U.S. Application Data

(63) Continuation of application No. PCT/CN2021/072395, filed on Jan. 18, 2021.

(30) Foreign Application Priority Data

Jan. 19, 2020  (CN) .......................... 202010059278.1

(51) Int. Cl.
*H04L 1/16*    (2023.01)
*H04L 1/1607*  (2023.01)
*H04L 5/00*    (2006.01)
*H04W 72/566*  (2023.01)

(52) U.S. Cl.
CPC .......... *H04L 1/1671* (2013.01); *H04L 5/0044* (2013.01); *H04L 5/0051* (2013.01); *H04L 5/0053* (2013.01); *H04W 72/569* (2023.01)

(58) Field of Classification Search
CPC ... H04L 1/1671; H04L 5/0044; H04L 5/0051; H04L 5/0053; H04L 5/0055; H04L 5/0057; H04L 5/0094; H04W 72/569; H04W 72/23; H04W 72/56
See application file for complete search history.

(56) References Cited

U.S. PATENT DOCUMENTS

2019/0037410 A1 *  1/2019  Yan ....................... H04W 16/10
2019/0115996 A1    4/2019  Wu et al.

OTHER PUBLICATIONS

ISR in application PCT/CN2021/072395 dated Apr. 30, 2021.

* cited by examiner

*Primary Examiner* — Steven Hieu D Nguyen

(57) ABSTRACT

A first node receives a first signaling; receives a second signaling; and transmits a first bit block in a target radio resource block. A first sub-bit-block and a second sub-bit-block are used to generate the first bit block, the first sub-bit-block being associated with the first signaling, and the second sub-bit-block being associated with the second signaling; the second signaling is used to indicate the target radio resource block from a target radio resource block set, the target radio resource block being a radio resource block comprised in the target radio resource block set; size of the second sub-bit-block is used to determine a reference radio resource block set; the second signaling is used to indicate a first index, and the first index is used jointly with the reference radio resource block set to determine the target radio resource block set, the first index being an integer.

20 Claims, 5 Drawing Sheets

METHOD AND DEVICE IN A NODE USED FOR WIRELESS COMMUNICATION

CROSS REFERENCE TO RELATED APPLICATIONS

This application is a continuation of International Application No. PCT/CN2021/072395, filed Jan. 18, 2021, claims the priority benefit of Chinese Patent Application No. 202010059278.1, filed on Jan. 19, 2020, the full disclosure of which is incorporated herein by reference.

BACKGROUND

Technical Field

The present disclosure relates to transmission methods and devices in wireless communication systems, and in particular to a method and a device of radio signal transmission in a wireless communication system that support cellular networks.

Related Art

In a 5G system, Enhance Mobile Broadband (eMBB) and Ultra Reliable and Low Latency Communication (URLLC) are two typical traffic types. Targeting requirements for lower target BLER of URLLC traffic, a new Modulation and Coding Scheme (MCS) table has been defined in 3rd Generation Partner Project (3GPP) New Radio (NR) Release 15. For the purpose of supporting more demanding URLLC traffics in 5G system, for example, with higher reliability (e.g., a target BLER is 10^-6) or with lower delay (e.g., 0.5-1 ms), in the 3GPP NR Release 16, a DCI signaling can indicate whether a PDSCH scheduled is of Low Priority or High Priority, wherein the Low Priority corresponds to URLLC traffics, while the High Priority corresponds to eMBB traffics. When a low-priority transmission overlaps with a high-priority transmission in time domain, the high-priority one is performed, and the low-priority one is dropped.

A Work Item (WI) of URLLC enhancement in NR Release 17 was approved at the 3GPP RAN #86 Plenary, and a focus of study in this WI is multiplexing of various Intra-UE (that is, User Equipment) traffics with different priorities.

SUMMARY

In order to support multiplexing of Intra-UE traffics with different priorities, a key issue of how to feedback Uplink Control Information (UCI) needs to be solved.

To address the above problem, the present disclosure provides a solution. It should be noted that though the present disclosure only took the uplink for example in the statement above, it is also applicable to other scenarios of downlink and sidelink transmissions, where similar technical effects can be achieved. Additionally, the adoption of a unified solution for various scenarios, including but not limited to uplink, downlink and sidelink, contributes to the reduction of hardcore complexity and costs. It should be noted that if no conflict is incurred, embodiments in a UE in the present disclosure and the characteristics of the embodiments are also applicable to a base station, and vice versa. What's more, the embodiments in the present disclosure and the characteristics in the embodiments can be arbitrarily combined if there is no conflict.

In one embodiment, interpretations of the terminology in the present disclosure refer to definitions given in the 3GPP TS36 series.

In one embodiment, interpretations of the terminology in the present disclosure refer to definitions given in the 3GPP TS38 series.

In one embodiment, interpretations of the terminology in the present disclosure refer to definitions given in the 3GPP TS37 series.

In one embodiment, interpretations of the terminology in the present disclosure refer to definitions given in Institute of Electrical and Electronics Engineers (IEEE) protocol specifications.

The present disclosure provides a method in a first node for wireless communications, comprising:
  receiving a first signaling;
  receiving a second signaling; and
  transmitting a first bit block in a target radio resource block;
  herein, a first sub-bit-block and a second sub-bit-block are used for generating the first bit block, the first sub-bit-block being associated with the first signaling, and the second sub-bit-block being associated with the second signaling; the second signaling is used for indicating the target radio resource block from a target radio resource block set, the target radio resource block being a radio resource block in the target radio resource block set, and the target radio resource block set comprising a positive integer number of radio resource block(s); size of the second sub-bit-block is used for determining a reference radio resource block set, the reference radio resource block set comprising a positive integer number of radio resource block(s); the second signaling is used for indicating a first index, and the first index is used together with the reference radio resource block set for determining the target radio resource block set, the first index being an integer.

In one embodiment, a key problem to be solved in the present disclosure is how to feedback UCI to support multiplexing of Intra-UE traffics with different priorities.

In one embodiment, a key problem to be solved in the present disclosure is how to determine a radio resource for feedback of UCI to support multiplexing of Intra-UE traffics with different priorities.

In one embodiment, a problem to be solved in the present disclosure is that in an NR system, a Physical Uplink Control CHannel (PUCCH) resource set is determined according to UCI size, that is, a number of bits comprised therein, and a Downlink Control Information (DCI) signaling indicates a PUCCH resource in the PUCCH resource set used for carrying UCI. With a view to supporting the multiplexing of Intra-UE traffics with various priorities, consideration shall again be given to how to determine the PUCCH resource set.

In one embodiment, the essence of the above method lies in that a first sub-bit-block is UCI corresponding to a first signaling, and a second sub-bit-block is UCI corresponding to a second signaling, and a first bit block is generated by multiplexing of the first sub-bit-block and the second sub-bit-block. A reference radio resource block set is determined according to size of the UCI corresponding to the second signaling, and a first index indicated by the second signaling and the reference radio resource block set jointly determine a target radio resource block set actually transmitting multiplexed UCI. An advantage of the method is that dynamic adjustments can be made to a radio resource set feeding back UCI to a certain degree, thus enhancing the flexibility of resource determination, and also flexible adjustments can be made to the size of UCI allowable for multiplexing; what's more, compared with indicating the radio resource set directly via a signaling, the scheme proposed above will produce smaller signaling overhead.

In one embodiment, the essence of the above method lies in that a first sub-bit-block is UCI corresponding to a first signaling, and a second sub-bit-block is UCI corresponding to a second signaling, and a first bit block is generated by multiplexing of the first sub-bit-block and the second sub-bit-block. A reference radio resource block set is a PUCCH resource set determined according to size of the UCI corresponding to the second signaling, and a first index indicated by DCI and the reference radio resource block set jointly determine a PUCCH resource set (i.e., a target radio resource block set) actually transmitting multiplexed UCI. An advantage of the method is that dynamic adjustments can be made to a PUCCH resource set feeding back UCI to a certain degree, thus enhancing the flexibility of PUCCH resource determining; DCI overhead generated in the scheme of the present disclosure is smaller than that by indicating the PUCCH resource set directly through a DCI signaling.

According to one aspect of the present disclosure, the above method is characterized in that the reference radio resource block set is one of N radio resource block sets, and the target radio resource block set is one of the N radio resource block sets, any of the N radio resource block sets comprising a positive integer number of radio resource block(s), N being a positive integer greater than 1; the first index and an index of the reference radio resource block set in the N radio resource block sets are used for determining an index of the target radio resource block set in the N radio resource block sets.

According to one aspect of the present disclosure, the above method is characterized in that the index of the target radio resource block set in the N radio resource block sets is equal to a sum of the first index and the index of the reference radio resource block set in the N radio resource block sets.

According to one aspect of the present disclosure, the above method is characterized in that the N radio resource block sets respectively correspond to N payload ranges, any of the N payload ranges comprises a positive integer number of value(s), and any value comprised in the N payload ranges is a positive integer, any two payload ranges of the N payload ranges being orthogonal; the reference radio resource block set is one of the N radio resource block sets that corresponds to a payload range comprising the size of the second sub-bit-block; a target payload range is one of the N payload ranges that corresponds to the target radio resource block set, and size of the first bit block belongs to the target payload range; the first sub-bit-block, the second sub-bit-block and the target payload range are jointly used for determining the first bit block.

According to one aspect of the present disclosure, the above method is characterized in comprising:
receiving first information;
herein, the first information is used for indicating the N radio resource block sets.

According to one aspect of the present disclosure, the above method is characterized in that both the first signaling and the second signaling comprise a first field, the first field comprised in the first signaling indicates a first priority, and the first field comprised in the second signaling indicates a second priority, the first priority being different from the second priority.

According to one aspect of the present disclosure, the above method is characterized in comprising:
receiving a first signal; and
receiving a second signal;
herein, the first signaling is used for indicating scheduling information of the first signal, and the second signaling is used for indicating scheduling information of the second signal, the first sub-bit-block is used for determining whether the first signal is correctly received, and the second sub-bit-block is used for determining whether the second signal is correctly received.

The present disclosure provides a method in a second node for wireless communications, comprising:
transmitting a first signaling;
transmitting a second signaling; and
receiving a first bit block in a target radio resource block;
herein, a first sub-bit-block and a second sub-bit-block are used for generating the first bit block, the first sub-bit-block being associated with the first signaling, and the second sub-bit-block being associated with the second signaling; the second signaling is used for indicating the target radio resource block from a target radio resource block set, the target radio resource block being a radio resource block in the target radio resource block set, and the target radio resource block set comprising a positive integer number of radio resource block(s); size of the second sub-bit-block is used for determining a reference radio resource block set, the reference radio resource block set comprising a positive integer number of radio resource block(s); the second signaling is used for indicating a first index, and the first index is used together with the reference radio resource block set for determining the target radio resource block set, the first index being an integer.

According to one aspect of the present disclosure, the above method is characterized in that the reference radio resource block set is one of N radio resource block sets, and the target radio resource block set is one of the N radio resource block sets, any of the N radio resource block sets comprising a positive integer number of radio resource block(s), N being a positive integer greater than 1; the first index and an index of the reference radio resource block set in the N radio resource block sets are used for determining an index of the target radio resource block set in the N radio resource block sets.

According to one aspect of the present disclosure, the above method is characterized in that the index of the target radio resource block set in the N radio resource block sets is equal to a sum of the first index and the index of the reference radio resource block set in the N radio resource block sets.

According to one aspect of the present disclosure, the above method is characterized in that the N radio resource block sets respectively correspond to N payload ranges, any of the N payload ranges comprises a positive integer number of value(s), and any value comprised in the N payload ranges is a positive integer, any two payload ranges of the N payload ranges being orthogonal; the reference radio resource block set is one of the N radio resource block sets that corresponds to a payload range comprising the size of the second sub-bit-block; a target payload range is one of the N payload ranges that corresponds to the target radio resource block set, and size of the first bit block belongs to the target payload range; the first sub-bit-block, the second sub-bit-block and the target payload range are jointly used for determining the first bit block.

According to one aspect of the present disclosure, the above method is characterized in comprising:

transmitting first information;

herein, the first information is used for indicating the N radio resource block sets.

According to one aspect of the present disclosure, the above method is characterized in that both the first signaling and the second signaling comprise a first field, the first field comprised in the first signaling indicates a first priority, and the first field comprised in the second signaling indicates a second priority, the first priority being different from the second priority.

According to one aspect of the present disclosure, the above method is characterized in comprising:

transmitting a first signal; and transmitting a second signal;

herein, the first signaling is used for indicating scheduling information of the first signal, and the second signaling is used for indicating scheduling information of the second signal, the first sub-bit-block is used for determining whether the first signal is correctly received, and the second sub-bit-block is used for determining whether the second signal is correctly received.

The present disclosure provides a first node for wireless communications, comprising:

a first receiver, receiving a first signaling; and receiving a second signaling; and a first transmitter, transmitting a first bit block in a target radio resource block;

herein, a first sub-bit-block and a second sub-bit-block are used for generating the first bit block, the first sub-bit-block being associated with the first signaling, and the second sub-bit-block being associated with the second signaling; the second signaling is used for indicating the target radio resource block from a target radio resource block set, the target radio resource block being a radio resource block in the target radio resource block set, and the target radio resource block set comprising a positive integer number of radio resource block(s); size of the second sub-bit-block is used for determining a reference radio resource block set, the reference radio resource block set comprising a positive integer number of radio resource block(s); the second signaling is used for indicating a first index, and the first index is used together with the reference radio resource block set for determining the target radio resource block set, the first index being an integer.

The present disclosure provides a second node for wireless communications, comprising:

a second transmitter, transmitting a first signaling; and transmitting a second signaling; and a second receiver, receiving a first bit block in a target radio resource block;

herein, a first sub-bit-block and a second sub-bit-block are used for generating the first bit block, the first sub-bit-block being associated with the first signaling, and the second sub-bit-block being associated with the second signaling; the second signaling is used for indicating the target radio resource block from a target radio resource block set, the target radio resource block being a radio resource block in the target radio resource block set, and the target radio resource block set comprising a positive integer number of radio resource block(s); size of the second sub-bit-block is used for determining a reference radio resource block set, the reference radio resource block set comprising a positive integer number of radio resource block(s); the second signaling is used for indicating a first index, and the first index is used together with the reference radio resource block set for determining the target radio resource block set, the first index being an integer.

In one embodiment, the method in the present disclosure has the following advantages:

The method proposed a scheme of feedback of UCI that supports the multiplexing of Intra-UE traffics with different priorities.

The method proposed a scheme of determining a radio resource for feedback of UCI that supports the multiplexing of Intra-UE traffics with different priorities.

In the method put forward by the present disclosure, dynamic adjustments can be made to a radio resource set for feeding back UCI to some extent, thereby enhancing the flexibility of resource determination, in addition, the size of UCI allowable for multiplexing can be adjusted flexibly.

In the method put forward by the present disclosure, signaling overhead incurred is smaller compared with indicating the radio resource set directly by a signaling.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
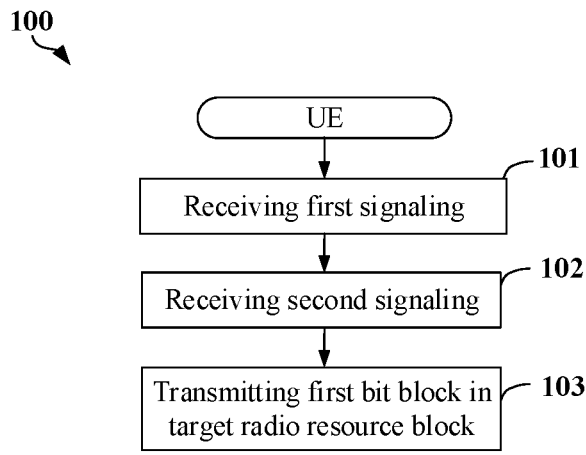
FIG. 1 illustrates a flowchart of a first signaling, a second signaling and a first bit block according to one embodiment of the present disclosure.

Embodiment 1 illustrates a flowchart of a first signaling, a second signaling and a first bit block according to one embodiment of the present disclosure, as shown in FIG. 1. In FIG. 1, each box represents a step. It should be specially noted that the order of each box arranged in this figure does not necessarily imply a chronological sequence of the steps marked by each box.

In Embodiment 1, the first node in the present disclosure receives a first signaling in step 101; receives a second signaling in step 102; and transmits a first bit block in a target radio resource block in step 103; herein, a first sub-bit-block and a second sub-bit-block are used for generating the first bit block, the first sub-bit-block being associated with the first signaling, and the second sub-bit-block being associated with the second signaling; the second signaling is used for indicating the target radio resource block from a target radio resource block set, the target radio resource block being a radio resource block in the target radio resource block set, and the target radio resource block set comprising a positive integer number of radio resource block(s); size of the second sub-bit-block is used for determining a reference radio resource block set, the reference radio resource block set comprising a positive integer number of radio resource block(s); the second signaling is used for indicating a first index, and the first index is used together with the reference radio resource block set for determining the target radio resource block set, the first index being an integer.

In one embodiment, the first signaling is dynamically configured.

In one embodiment, the first signaling is a physical layer signaling.

In one embodiment, the first signaling is a DCI signaling.

In one embodiment, the first signaling is transmitted on a downlink physical layer control channel (i.e., a downlink channel only capable of carrying a physical layer signaling).

In one embodiment, the first signaling is DCI format 1_0, and the specific meaning of the DCI format 1_0 can be found in 3GPP TS38.212, section 7.3.1.2.

In one embodiment, the first signaling is DCI format 1_1, and the specific meaning of the DCI format 1_1 can be found in 3GPP TS38.212, section 7.3.1.2.

In one embodiment, the first signaling is DCI format 1_2, and the specific meaning of the DCI format 1_2 can be found in 3GPP TS38.212, section 7.3.1.2.

In one embodiment, the first signaling comprises a signaling used for indicating Semi-Persistent Scheduling (SPS) Release.

In one embodiment, the first signaling comprises a signaling used for indicating configuration information of a downlink physical layer data channel.

In one embodiment, the first signaling comprises a signaling used for indicating configuration information of a Physical Downlink Shared Channel (PDSCH).

In one embodiment, the first signaling comprises a signaling used for scheduling of a downlink physical layer data channel.

In one embodiment, the first signaling comprises a signaling used for scheduling of a PDSCH.

In one embodiment, the second signaling is dynamically configured.

In one embodiment, the second signaling is a physical layer signaling.

In one embodiment, the second signaling is a DCI signaling.

In one embodiment, the second signaling is transmitted on a downlink physical layer control channel (i.e., a downlink channel only capable of carrying a physical layer signaling).

In one embodiment, the second signaling is DCI format 1_0, and the specific meaning of the DCI format 1_0 can be found in 3GPP TS38.212, section 7.3.1.2.

In one embodiment, the second signaling is DCI format 1_1, and the specific meaning of the DCI format 1_1 can be found in 3GPP TS38.212, section 7.3.1.2.

In one embodiment, the second signaling is DCI format 1_2, and the specific meaning of the DCI format 1_2 can be found in 3GPP TS38.212, section 7.3.1.2.

In one embodiment, the second signaling comprises a signaling used for indicating SPS Release.

In one embodiment, the second signaling comprises a signaling used for indicating configuration information of a downlink physical layer data channel.

In one embodiment, the second signaling comprises a signaling used for indicating configuration information of a PDSCH.

In one embodiment, the second signaling comprises a signaling used for scheduling of a downlink physical layer data channel.

In one embodiment, the second signaling comprises a signaling used for scheduling of a PDSCH.

In one embodiment, the first signaling and the second signaling are of a same format.

In one embodiment, the first signaling and the second signaling are of different formats.

In one embodiment, the target radio resource block comprises a time-domain resource, a frequency-domain resource and a code-domain resource.

In one embodiment, the target radio resource block comprises at least one of a time-domain resource, a frequency-domain resource or a code-domain resource.

In one embodiment, the target radio resource block comprises a time-domain resource and a frequency-domain resource.

In one embodiment, the target radio resource block comprises a code-domain resource.

In one embodiment, any radio resource block in the target radio resource block set comprises a time-domain resource, a frequency-domain resource and a code-domain resource.

In one embodiment, any radio resource block in the target radio resource block set comprises at least one of a time-domain resource, a frequency-domain resource or a code-domain resource.

In one embodiment, any radio resource block in the target radio resource block set comprises a time-domain resource and a frequency-domain resource.

In one embodiment, any radio resource block in the target radio resource block set comprises a code-domain resource.

In one embodiment, a time-frequency resource occupied by the target radio resource block comprises a positive integer number of Resource Element(s) (RE(s)), and a time-frequency resource occupied by any radio resource block in the target radio resource block set comprises a positive integer number of RE(s).

In one embodiment, the target radio resource block comprises a positive integer number of subcarrier(s) in frequency domain, and any radio resource block in the target radio resource block set comprises a positive integer number of subcarrier(s) in frequency domain.

In one embodiment, the target radio resource block comprises a positive integer number of Physical Resource Block(s) (PRB(s)) in frequency domain, and any radio resource block in the target radio resource block set comprises a positive integer number of PRB(s) in frequency domain.

In one embodiment, the target radio resource block comprises a positive integer number of Resource Block(s) (RB(s)) in frequency domain, and any radio resource block in the target radio resource block set comprises a positive integer number of RB(s) in frequency domain.

In one embodiment, the target radio resource block comprises a positive integer number of multicarrier symbol(s) in time domain, and any radio resource block in the target radio resource block set comprises a positive integer number of multicarrier symbol(s) in time domain.

In one embodiment, the target radio resource block belongs to a slot in time domain, and any radio resource block in the target radio resource block set belongs to a slot in time domain.

In one embodiment, the target radio resource block belongs to a sub-frame in time domain, and any radio resource block in the target radio resource block set belongs to a sub-frame in time domain.

In one embodiment, the target radio resource block set is configured by a higher layer signaling.

In one embodiment, the target radio resource block set is configured by an RRC signaling.

In one embodiment, the target radio resource block set is configured by a MAC CE signaling.

In one embodiment, the target radio resource block set is preconfigured.

In one embodiment, any radio resource block in the target radio resource block set is reserved for a PUCCH.

In one embodiment, an RE occupies a multicarrier symbol in time domain, and a subcarrier in frequency domain.

In one embodiment, the multicarrier symbol is an Orthogonal Frequency Division Multiplexing (OFDM) symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, the first bit block comprises UCI.

In one embodiment, the first bit block comprises a Hybrid Automatic Repeat reQuest-Acknowledgement (HARQ-ACK).

In one embodiment, the first bit block comprises a HARQ-ACK and Channel State Information (CSI).

In one embodiment, the first bit block comprises a HARQ-ACK and a Scheduling Request (SR).

In one embodiment, the first bit block comprises a HARQ-ACK, CSI and an SR.

In one embodiment, the first bit block comprises at least one of a HARQ-ACK, CSI or an SR.

In one embodiment, the first sub-bit-block comprises UCI.

In one embodiment, the first sub-bit-block comprises a HARQ-ACK.

In one embodiment, the first sub-bit-block comprises a HARQ-ACK and CSI.

In one embodiment, the first sub-bit-block comprises a HARQ-ACK and an SR.

In one embodiment, the first sub-bit-block comprises a HARQ-ACK, CSI and an SR.

In one embodiment, the first sub-bit-block comprises at least one of a HARQ-ACK, CSI or an SR.

In one embodiment, the second sub-bit-block comprises UCI.

In one embodiment, the second sub-bit-block comprises a HARQ-ACK.

In one embodiment, the second sub-bit-block comprises a HARQ-ACK and CSI.

In one embodiment, the second sub-bit-block comprises a HARQ-ACK and an SR.

In one embodiment, the second sub-bit-block comprises a HARQ-ACK, CSI and an SR.

In one embodiment, the second sub-bit-block comprises at least one of a HARQ-ACK, CSI or an SR.

In one embodiment, the first bit block comprises a positive integer number of bit(s), and the size of the first bit block is a number of bits comprised by the first bit block; the first sub-bit-block comprises a positive integer number of bit(s), and the size of the first sub-bit-block is a number of bits comprised by the first sub-bit-block; the second sub-bit-block comprises a positive integer number of bit(s), and the size of the second sub-bit-block is a number of bits comprised by the second sub-bit-block.

In one embodiment, the first bit block is composed of the first sub-bit-block and part of or all bits in the second sub-bit-block.

In one embodiment, size of the first bit block is no greater than a sum of size of the first sub-bit-block and size of the second sub-bit-block.

In one embodiment, size of the first bit block is equal to a sum of size of the first sub-bit-block and size of the second sub-bit-block, the first bit block comprising the first sub-bit-block and the second sub-bit-block.

In one embodiment, size of the first bit block is smaller than a sum of size of the first sub-bit-block and size of the second sub-bit-block, the first bit block composed of the first sub-bit-block and part of bits in the second sub-bit-block.

In one embodiment, the first sub-bit-block comprises a HARQ-ACK associated with the first signaling.

In one subembodiment, the HARQ-ACK associated with the first signaling comprises an ACK.

In one subembodiment, the HARQ-ACK associated with the first signaling comprises a NACK.

In one subembodiment, the HARQ-ACK associated with the first signaling comprises an ACK or a NACK.

In one subembodiment, the HARQ-ACK associated with the first signaling indicates whether each bit block in a bit block set scheduled by the first signaling is correctly received.

In one subembodiment, the first signaling comprises a signaling used for scheduling a downlink physical layer data channel, and the HARQ-ACK associated with the first signaling indicates whether transmission of the downlink physical layer data channel scheduled by the first signaling is correctly received.

In one subembodiment, the first signaling comprises a signaling used for scheduling a PDSCH, and the HARQ-ACK associated with the first signaling indicates whether transmission of the PDSCH scheduled by the first signaling is correctly received.

In one subembodiment, the HARQ-ACK associated with the first signaling indicates whether the first signaling is correctly received.

In one subembodiment, the first signaling comprises a signaling used for indicating SPS Release, and the HARQ-ACK associated with the first signaling indicates whether the first signaling is correctly received.

In one embodiment, the first sub-bit-block comprises CSI associated with the first signaling.

In one subembodiment, the first signaling comprises a signaling used for triggering a CSI Request, and the CSI associated with the first signaling corresponds to the CSI Request triggered by the first signaling.

In one subembodiment, the first signaling comprises a signaling used for triggering a Channel State Information-Reference Signal (CSI-RS), and the CSI associated with the first signaling is obtained by measurement on the CSI-RS triggered by the first signaling.

In one embodiment, the second sub-bit-block comprises a HARQ-ACK associated with the second signaling.

In one subembodiment, the HARQ-ACK associated with the second signaling comprises an ACK.

In one subembodiment, the HARQ-ACK associated with the second signaling comprises a NACK.

In one subembodiment, the HARQ-ACK associated with the second signaling comprises an ACK or a NACK.

In one subembodiment, the HARQ-ACK associated with the second signaling indicates whether each bit block in a bit block set scheduled by the second signaling is correctly received.

In one subembodiment, the second signaling comprises a signaling used for scheduling a downlink physical layer data channel, and the HARQ-ACK associated with the second signaling indicates whether transmission of the downlink physical layer data channel scheduled by the second signaling is correctly received.

In one subembodiment, the second signaling comprises a signaling used for scheduling a PDSCH, and the HARQ-ACK associated with the second signaling indicates whether transmission of the PDSCH scheduled by the second signaling is correctly received.

In one subembodiment, the HARQ-ACK associated with the second signaling indicates whether the second signaling is correctly received.

In one subembodiment, the second signaling comprises a signaling used for indicating SPS Release, and the HARQ-ACK associated with the second signaling indicates whether the second signaling is correctly received.

In one embodiment, the second sub-bit-block comprises CSI associated with the second signaling.

In one subembodiment, the second signaling comprises a signaling used for triggering a CSI Request, and the CSI associated with the second signaling corresponds to the CSI Request triggered by the second signaling.

In one subembodiment, the second signaling comprises a signaling used for triggering a reference signal (RS), and the CSI associated with the second signaling is obtained by measurement on the RS triggered by the second signaling.

In one subembodiment, the second signaling comprises a signaling used for triggering a CSI-RS, and the CSI associated with the second signaling is obtained by measurement on the CSI-RS triggered by the second signaling.

In one embodiment, the second signaling is used for explicitly indicating the target radio resource block from a target radio resource block set.

In one embodiment, the second signaling is used for implicitly indicating the target radio resource block from a target radio resource block set.

In one embodiment, the second signaling is used for indicating a second index, and the second index is used for indicating the target radio resource block from a target radio resource block set.

In one subembodiment, the second index is a non-negative integer.

In one subembodiment, the second index is a positive integer.

In one subembodiment, the second signaling explicitly indicates the second index.

In one subembodiment, the second signaling implicitly indicates the second index.

In one subembodiment, the second index is used for explicitly indicating the target radio resource block from a target radio resource block set.

In one subembodiment, the second index is used for implicitly indicating the target radio resource block from a target radio resource block set.

In one subembodiment, the second index is an index of the target radio resource block in the target radio resource block set.

In one subembodiment, a PUCCH resource indicator field comprised by the second signaling indicates the second index, and the specific meaning of the PUCCH resource indicator field can be found in 3GPP TS38.212, section 7.3.1.2.

In one embodiment, the first index is a non-negative integer.

In one embodiment, the first index is a positive integer.

In one embodiment, the first index is an integer.

In one embodiment, the second signaling explicitly indicates a first index.

In one embodiment, the second signaling implicitly indicates a first index.

In one embodiment, the second signaling comprises a second field, and the second field comprised in the second signaling indicates the first index; the second field comprised in the second signaling comprises a positive integer number of bit(s).

In one embodiment, the second signaling comprises a second field, and the second field comprised in the second signaling indicates the first index and the second index; the second field comprised in the second signaling comprises a positive integer number of bit(s).

In one embodiment, the second signaling comprises a third field, and the third field comprised in the second signaling indicates the second index; the third field comprised in the second signaling comprises a positive integer number of bit(s).

In one subembodiment, the third field comprised in the second signaling comprises one bit.

In one subembodiment, the third field comprised in the second signaling comprises more than one bit.

Embodiment 2

Figure 2:
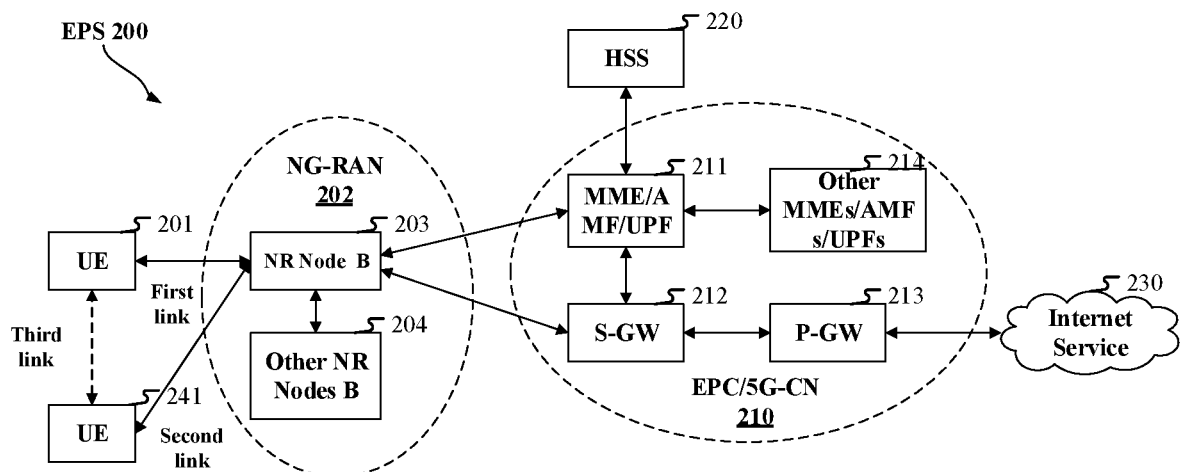
FIG. 2 illustrates a schematic diagram of a network architecture according to one embodiment of the present disclosure.

Embodiment 2 illustrates a schematic diagram of a network architecture according to the present disclosure, as shown in FIG. 2.

FIG. 2 is a diagram illustrating a network architecture 200 of 5G NR, Long-Term Evolution (LTE), and Long-Term Evolution Advanced (LTE-A) systems. The 5G NR or LTE network architecture 200 may be called an Evolved Packet System (EPS) 200 or any other appropriate term. The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services. The NG-RAN 202 comprises an NR node B (gNB) 203 and other gNBs 204. The gNB 203 provides UE 201-oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, Non-Terrestrial base station communications, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet Service 230. The Internet Service 230 comprises operator-compatible IP services, specifically including Internet, Intranet, IP Multimedia Subsystem (IMS) and Packet Switching Streaming (PSS) services.

In one embodiment, the UE 201 corresponds to the first node in the present disclosure.

In one embodiment, the UE 241 corresponds to the second node in the present disclosure.

In one embodiment, the gNB 203 corresponds to the second node in the present disclosure.

Embodiment 3

Figure 3:
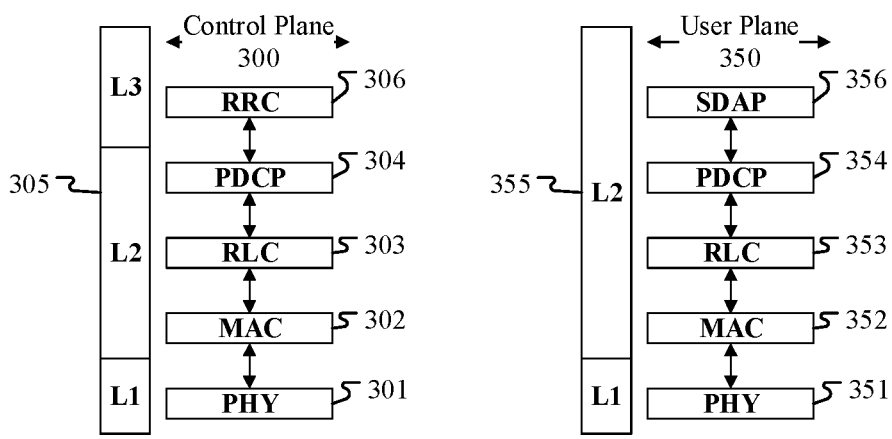
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first communication node (UE, gNB or, RSU in V2X) and a second communication node (gNB, UE, or RSU in V2X), or between two UEs is represented by three layers, which are a layer 1, a layer 2 and a layer 3, respectively. The layer 1 (L1) is the lowest layer which performs signal processing functions of various PHY layers. The L1 is called PHY 301 in the present disclosure. The layer 2 (L2) 305 is above the PHY 301, and is in charge of the link between the first communication node and the second communication node, and between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication nodes of the network side. The PDCP sublayer 304 provides multiplexing among variable radio bearers and logical channels. The PDCP sublayer 304 provides security by encrypting a packet and provides support for handover of a first communication node between second communication nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second communication node and the first communication node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first communication node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first information in the present disclosure is generated by the RRC sublayer 306.

In one embodiment, the first information in the present disclosure is generated by the MAC sublayer 302.

In one embodiment, the first information in the present disclosure is generated by the MAC sublayer 352.

In one embodiment, the first information in the present disclosure is generated by the PHY301.

In one embodiment, the first information in the present disclosure is generated by the PHY351.

In one embodiment, the first signaling in the present disclosure is generated by the PHY301.

In one embodiment, the first signaling in the present disclosure is generated by the PHY351.

In one embodiment, the second signaling in the present disclosure is generated by the PHY301.

In one embodiment, the second signaling in the present disclosure is generated by the PHY351.

In one embodiment, the first signal in the present disclosure is generated by the PHY301.

In one embodiment, the first signal in the present disclosure is generated by the PHY351.

In one embodiment, the second signal in the present disclosure is generated by the PHY301.

In one embodiment, the second signal in the present disclosure is generated by the PHY351.

In one embodiment, the first bit block in the present disclosure is generated by the PHY301.

In one embodiment, the first bit block in the present disclosure is generated by the PHY351.

Embodiment 4

Figure 4:
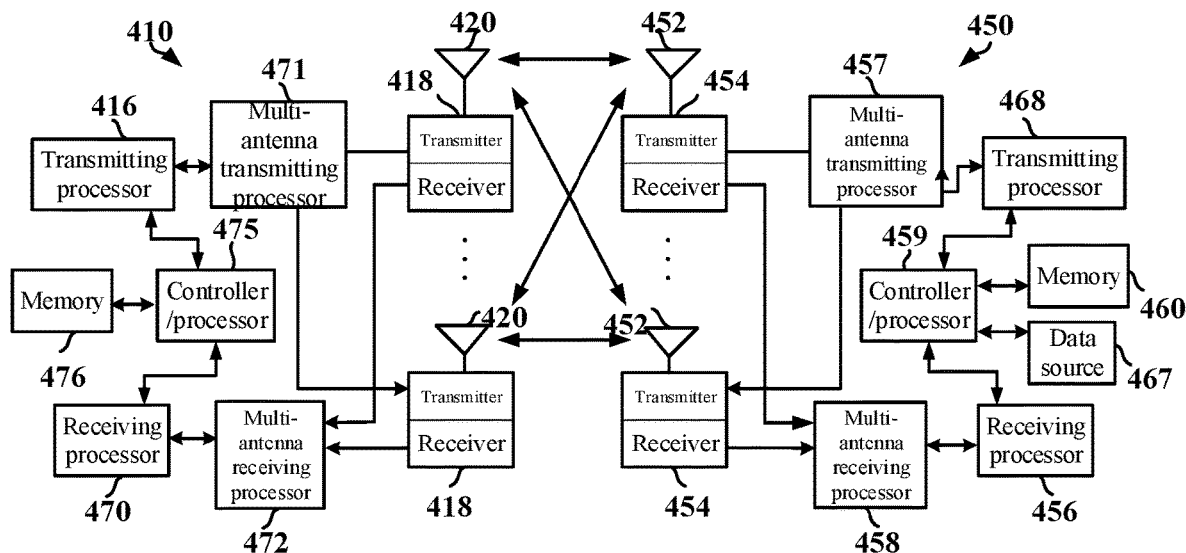
FIG. 4 illustrates a schematic diagram of a first communication device and a second communication device according to one embodiment of the present disclosure.

Embodiment 4 illustrates a schematic diagram of a first communication device and a second communication device according to the present disclosure, as shown in FIG. 4. FIG. 4 is a block diagram of a first communication device 410 and a second communication device 450 in communication with each other in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from a core network is provided to the controller/processor 475. The controller/processor 475 implements the functionality of the L2 layer. The controller/processor 475 provides header compression, encryption, packet segmentation and reordering, and multiplexing between a logical channel and a transport channel, and radio resource allocation of the second communication device 450 based on various priorities. The controller/processor 475 is also in charge of a retransmission of a lost packet and a signaling to the second communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 450 side and the mapping to signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams.

After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any second communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the first communication device 410 on the physical channel. Next, the higher-layer data and control signal are provided to the controller/processor 459. The controller/processor 459 performs functions of the L2 layer. The controller/processor 459 can be associated with a memory 460 that stores program code and data. The memory 460 can be called a computer readable medium. In a transmission between the first communication device 410 and the second communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer, or various control signals can be provided to the L3 layer for processing.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in the transmission from the first communication device 410 to the second communication device 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the first communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission between the second communication device 450 and the first communication device 410, the controller/processor 475 provides de-multiplexing between a transport channel and a logical channel, packet reassembling, decrypting, header decompression, control signal processing so as to recover a higher-layer packet from the second communication device 450. The higher-layer packet coming from the controller/processor 475 may be provided to the core network.

In one embodiment, the first node in the present disclosure comprises the second communication device 450, and the second node in the present disclosure comprises the first communication device 410.

In one subembodiment, the first node is a UE, and the second node is a UE.

In one subembodiment, the first node is a UE, and the second node is a relay node.

In one subembodiment, the first node is a relay node, and the second node is a UE.

In one subembodiment, the first node is a UE, and the second node is a base station.

In one subembodiment, the first node is a relay node, and the second node is a base station.

In one subembodiment, the second communication device 450 comprises at least one controller/processor; the at least one controller/processor is in charge of HARQ operation.

In one subembodiment, the first communication device 410 comprises at least one controller/processor; the at least one controller/processor is in charge of HARQ operation.

In one subembodiment, the first communication device 410 comprises at least one controller/processor; the at least one controller/processor is in charge of error detection using ACK and/or NACK protocols to support HARQ operation.

In one embodiment, the second communication device 450 comprises at least one processor and at least one memory, the at least one memory comprises computer program codes; the at least one memory and the computer program codes are configured to be used in collaboration with the at least one processor, the second communication device 450 at least receives a first signaling; receives a second signaling; and transmits a first bit block in a target radio resource block; herein, a first sub-bit-block and a second sub-bit-block are used for generating the first bit block, the first sub-bit-block being associated with the first signaling, and the second sub-bit-block being associated with the second signaling; the second signaling is used for indicating the target radio resource block from a target radio resource block set, the target radio resource block being a radio resource block in the target radio resource block set, and the target radio resource block set comprising a positive integer number of radio resource block(s); size of the second sub-bit-block is used for determining a reference radio resource block set, the reference radio resource block set comprising a positive integer number of radio resource block(s); the second signaling is used for indicating a first index, and the first index is used together with the reference radio resource block set for determining the target radio resource block set, the first index being an integer.

In one subembodiment, the second communication device 450 corresponds to the first node in the present disclosure.

In one embodiment, the second communication device 450 comprises a memory that stores computer readable instruction program, the computer readable instruction program generates actions when executed by at least one processor, which include: receiving a first signaling; receiving a second signaling; and transmitting a first bit block in a target radio resource block; herein, a first sub-bit-block and a second sub-bit-block are used for generating the first bit block, the first sub-bit-block being associated with the first signaling, and the second sub-bit-block being associated with the second signaling; the second signaling is used for indicating the target radio resource block from a target radio resource block set, the target radio resource block being a radio resource block in the target radio resource block set, and the target radio resource block set comprising a positive integer number of radio resource block(s); size of the second sub-bit-block is used for determining a reference radio resource block set, the reference radio resource block set comprising a positive integer number of radio resource block(s); the second signaling is used for indicating a first index, and the first index is used together with the reference radio resource block set for determining the target radio resource block set, the first index being an integer.

In one subembodiment, the second communication device 450 corresponds to the first node in the present disclosure.

In one embodiment, the first communication device 410 comprises at least one processor and at least one memory, the at least one memory comprises computer program codes; the at least one memory and the computer program codes are configured to be used in collaboration with the at least one processor. The first communication device 410 at least transmits a first signaling; transmits a second signaling; and receives a first bit block in a target radio resource block; herein, a first sub-bit-block and a second sub-bit-block are used for generating the first bit block, the first sub-bit-block being associated with the first signaling, and the second sub-bit-block being associated with the second signaling; the second signaling is used for indicating the target radio resource block from a target radio resource block set, the target radio resource block being a radio resource block in the target radio resource block set, and the target radio resource block set comprising a positive integer number of radio resource block(s); size of the second sub-bit-block is used for determining a reference radio resource block set, the reference radio resource block set comprising a positive integer number of radio resource block(s); the second signaling is used for indicating a first index, and the first index is used together with the reference radio resource block set for determining the target radio resource block set, the first index being an integer.

In one subembodiment, the first communication device 410 corresponds to the second node in the present disclosure.

In one embodiment, the first communication device 410 comprises a memory that stores computer readable instruction program, the computer readable instruction program generates actions when executed by at least one processor, which include: transmitting a first signaling; transmitting a second signaling; and receiving a first bit block in a target radio resource block; herein, a first sub-bit-block and a second sub-bit-block are used for generating the first bit block, the first sub-bit-block being associated with the first signaling, and the second sub-bit-block being associated with the second signaling; the second signaling is used for indicating the target radio resource block from a target radio resource block set, the target radio resource block being a radio resource block in the target radio resource block set, and the target radio resource block set comprising a positive integer number of radio resource block(s); size of the second sub-bit-block is used for determining a reference radio resource block set, the reference radio resource block set comprising a positive integer number of radio resource block(s); the second signaling is used for indicating a first index, and the first index is used together with the reference radio resource block set for determining the target radio resource block set, the first index being an integer.

In one subembodiment, the first communication device 410 corresponds to the second node in the present disclosure.

In one embodiment, at least one of the antenna 452, the receiver 454, the multi-antenna receiving processor 458, the receiving processor 456, the controller/processor 459, the memory 460 or the data source 467 is used for receiving the first information in the present disclosure.

In one embodiment, at least one of the antenna 420, the transmitter 418, the multi-antenna transmitting processor 471, the transmitting processor 416, the controller/processor 475 or the memory 476 is used for transmitting the first information in the present disclosure.

In one embodiment, at least one of the antenna 452, the receiver 454, the multi-antenna receiving processor 458, the receiving processor 456, the controller/processor 459, the memory 460 or the data source 467 is used for receiving the first signaling in the present disclosure.

In one embodiment, at least one of the antenna 420, the transmitter 418, the multi-antenna transmitting processor 471, the transmitting processor 416, the controller/processor 475 or the memory 476 is used for transmitting the first signaling in the present disclosure.

In one embodiment, at least one of the antenna 452, the receiver 454, the multi-antenna receiving processor 458, the receiving processor 456, the controller/processor 459, the memory 460 or the data source 467 is used for receiving the first signal in the present disclosure.

In one embodiment, at least one of the antenna 420, the transmitter 418, the multi-antenna transmitting processor 471, the transmitting processor 416, the controller/processor 475 or the memory 476 is used for transmitting the first signal in the present disclosure.

In one embodiment, at least one of the antenna 452, the receiver 454, the multi-antenna receiving processor 458, the receiving processor 456, the controller/processor 459, the memory 460 or the data source 467 is used for receiving the second signaling in the present disclosure.

In one embodiment, at least one of the antenna 420, the transmitter 418, the multi-antenna transmitting processor 471, the transmitting processor 416, the controller/processor 475 or the memory 476 is used for transmitting the second signaling in the present disclosure.

In one embodiment, at least one of the antenna 452, the receiver 454, the multi-antenna receiving processor 458, the receiving processor 456, the controller/processor 459, the memory 460 or the data source 467 is used for receiving the second signal in the present disclosure.

In one embodiment, at least one of the antenna 420, the transmitter 418, the multi-antenna transmitting processor 471, the transmitting processor 416, the controller/processor 475 or the memory 476 is used for transmitting the second signal in the present disclosure.

In one embodiment, at least one of the antenna 452, the transmitter 454, the multi-antenna transmitting processor 458, the transmitting processor 468, the controller/processor 459, the memory 460 or the data source 467 is used for transmitting the first bit block in the present disclosure in the target radio resource block in the present disclosure.

In one embodiment, at least one of the antenna 420, the receiver 418, the multi-antenna receiving processor 472, the receiving processor 470, the controller/processor 475 or the memory 476 is used for receiving the first bit block in the present disclosure in the target radio resource block in the present disclosure.

Embodiment 5

Figure 5:
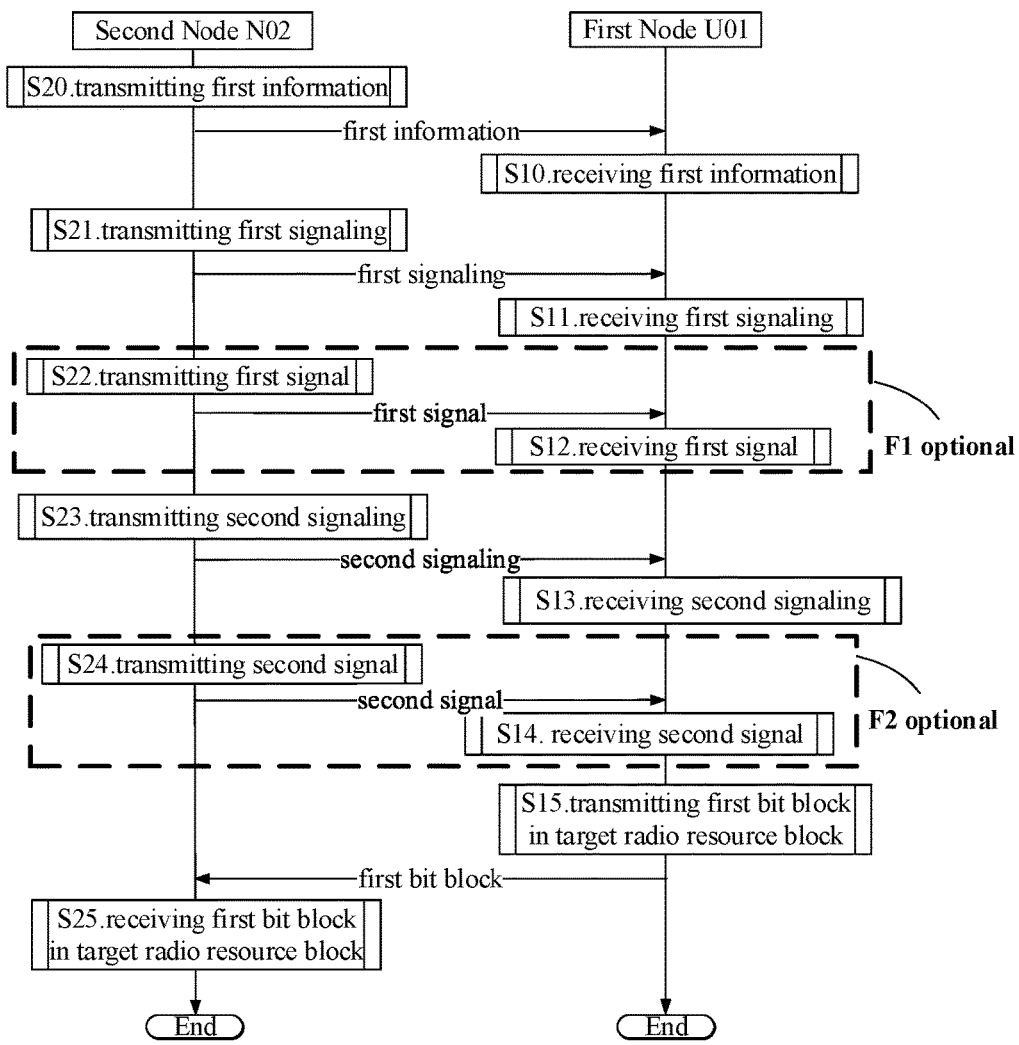
FIG. 5 illustrates a flowchart of radio signal transmission according to one embodiment of the present disclosure.

Embodiment 5 illustrates a flowchart of radio signal transmission according to one embodiment of the present disclosure, as shown in FIG. 5. In FIG. 5, a first node U01 and a second node N02 are in communication via an air interface. In FIG. 5, the boxes F1 and F2, which are framed with broken lines, are optional.

The first node U01 receives first information in step S10; receives a first signaling in step S11; receives a first signal in step S12; and receives a second signaling in step S13; receives a second signal in step S14; and transmits a first bit block in a target radio resource block in step S15.

The second node N02 transmits first information in step S20; transmits a first signaling in step S21; and transmits a first signal in step S22; transmits a second signaling in step S23; transmits a second signal in step S24; and receives a first bit block in a target radio resource block in step S25.

In Embodiment 5, a first sub-bit-block and a second sub-bit-block are used by the first node U01 for generating the first bit block, the first sub-bit-block being associated with the first signaling, and the second sub-bit-block being associated with the second signaling; the second signaling is used by the second node N02 for indicating the target radio resource block from a target radio resource block set, the target radio resource block being a radio resource block in the target radio resource block set, and the target radio resource block set comprising a positive integer number of radio resource block(s); size of the second sub-bit-block is used by the first node U01 for determining a reference radio resource block set, the reference radio resource block set comprising a positive integer number of radio resource block(s); the second signaling is used by the second node N02 for indicating a first index, and the first index is used together with the reference radio resource block set by the first node U01 for determining the target radio resource block set, the first index being an integer. The first information is used by the second node N02 for indicating the N radio resource block sets. The first signaling is used by the second node N02 for indicating scheduling information of the first signal, while the second signaling is used by the second node N02 for indicating scheduling information of the second signal, the first sub-bit-block is used for determining whether the first signal is correctly received, and the second sub-bit-block is used for determining whether the second signal is correctly received.

In one embodiment, the first signaling is used by the second node N02 for indicating a first radio resource block, the first radio resource block being reserved for the first sub-bit-block.

In one subembodiment, the first signaling explicitly indicates the first radio resource block.

In one subembodiment, the first signaling implicitly indicates the first radio resource block.

In one subembodiment, the first signaling comprises a second field, and the second field comprised in the first signaling indicates an index of the first radio resource block in a first radio resource block set; the first radio resource block set is one of the N radio resource block sets; the second field comprised in the first signaling comprises a positive integer number of bit(s).

In one subembodiment, the first signaling comprises a third field, and the third field comprised in the first signaling indicates an index of the first radio resource block in a first radio resource block set; the first radio resource block set is one of the N radio resource block sets; the third field comprised in the first signaling comprises a positive integer number of bit(s).

In one subembodiment, the first radio resource block overlaps with the target radio resource block in time domain.

In one subembodiment, a time unit to which the first radio resource block belongs and a time unit to which the target radio resource block belongs are overlapping.

In one subembodiment, the second signaling is used by the second node N02 for indicating a second index, and the second index is an index of the target radio resource block in the target radio resource block set, and the second index is an index of a reference radio resource block in the reference radio resource block set, the reference radio resource block being reserved for the second sub-bit-block; the first radio resource block overlaps with the reference radio resource block in time domain.

In one subembodiment, the second signaling is used by the second node N02 for indicating a second index, and the second index is an index of the target radio resource block in the target radio resource block set, and the second index is an index of a reference radio resource block in the reference radio resource block set, the reference radio resource block being reserved for the second sub-bit-block; a time unit to which the first radio resource block belongs and a time unit to which the reference radio resource block belong are overlapping.

In one subembodiment, a time unit to which the first radio resource block belongs comprises a slot, and a time unit to which the target radio resource block belongs comprises a slot.

In one subembodiment, a time unit to which the first radio resource block belongs comprises a subframe, and a time unit to which the target radio resource block belongs comprises a subframe.

In one subembodiment, a time unit to which the first radio resource block belongs comprises a positive integer number of consecutive multicarrier symbols, and a time unit to which the target radio resource block belongs comprises a positive integer number of consecutive multicarrier symbols; the number of multicarrier symbols comprised in the time unit to which the first radio resource block belongs is equal to the number of multicarrier symbols comprised in the time unit to which the target radio resource block belongs.

In one subembodiment, a time unit to which the first radio resource block belongs comprises a slot, and a time unit to which the reference radio resource block belongs comprises a slot.

In one embodiment, a time unit to which the first radio resource block belongs comprises a subframe, and a time unit to which the reference radio resource block belongs comprises a subframe.

In one subembodiment, a time unit to which the first radio resource block belongs comprises a positive integer number of consecutive multicarrier symbols, and a time unit to which the reference radio resource block belongs comprises a positive integer number of consecutive multicarrier symbols; the number of multicarrier symbols comprised in the time unit to which the first radio resource block belongs is equal to the number of multicarrier symbols comprised in the time unit to which the reference radio resource block belongs.

In one embodiment, any radio resource block of the N radio resource block sets comprises a time-domain resource, a frequency-domain resource and a code-domain resource.

In one embodiment, any radio resource block of the N radio resource block sets comprises at least one of a time-domain resource, a frequency-domain resource or a code-domain resource.

In one embodiment, any radio resource block of the N radio resource block sets comprises a time-domain resource and a frequency-domain resource.

In one embodiment, any radio resource block of the N radio resource block sets comprises a code-domain resource.

In one embodiment, a time-frequency resource occupied by any radio resource block of the N radio resource block sets comprises a positive integer number of RE(s).

In one embodiment, any radio resource block of the N radio resource block sets comprises a positive integer number of subcarrier(s) in frequency domain.

In one embodiment, any radio resource block of the N radio resource block sets comprises a positive integer number of PRB(s) in frequency domain.

In one embodiment, any radio resource block of the N radio resource block sets comprises a positive integer number of RB(s) in frequency domain.

In one embodiment, any radio resource block of the N radio resource block sets comprises a positive integer number of multicarrier symbol(s) in time domain.

In one embodiment, any radio resource block of the N radio resource block sets belongs to a slot in time domain.

In one embodiment, any radio resource block of the N radio resource block sets belongs to a subframe in time domain.

In one embodiment, any radio resource block of the N radio resource block sets is reserved for a PUCCH.

In one embodiment, the first information is semi-statically configured.

In one embodiment, the first information is carried by a higher layer signaling.

In one embodiment, the first information is carried by an RRC signaling.

In one embodiment, the first information comprises one or more IEs in an RRC signaling.

In one embodiment, the first information comprises all or part of an IE in an RRC signaling.

In one embodiment, the first information comprises multiple IEs in an RRC signaling.

In one embodiment, the first information explicitly indicates the N radio resource block sets.

In one embodiment, the first information implicitly indicates the N radio resource block sets.

In one embodiment, the first information is used by the second node N02 for indicating the N radio resource block sets and the N payload ranges.

In one embodiment, the first information explicitly indicates the N payload ranges.

In one embodiment, the first information implicitly indicates the N payload ranges.

In one embodiment, the first information comprises configuration information of each radio resource block of the N radio resource block sets.

In one embodiment, configuration information of any radio resource block of the N radio resource block sets comprises at least one of a time-domain resource occupied, a code-domain resource occupied, a frequency-domain resource occupied or a corresponding antenna port group.

In one embodiment, configuration information of any radio resource block of the N radio resource block sets comprises a time-domain resource occupied, a code-domain resource occupied, a frequency-domain resource occupied and a corresponding antenna port group.

In one embodiment, configuration information of any radio resource block of the N radio resource block sets comprises an initial multicarrier symbol occupied, a number of multicarrier symbols occupied, an initial PRB before or without frequency hopping, an initial PRB after frequency hopping, a number of PRBs occupied, settings of frequency hopping, a Cyclic Shift (CS), an Orthogonal Cover Code (OCC), an OCC length, a corresponding antenna port group and a maximum Code Rate.

In one embodiment, configuration information of any radio resource block of the N radio resource block sets comprises at least one of an initial multicarrier symbol occupied, a number of multicarrier symbols occupied, an initial PRB before or without frequency hopping, an initial PRB after frequency hopping, a number of PRBs occupied, settings of frequency hopping, a Cyclic Shift (CS), an Orthogonal Cover Code (OCC), an OCC length, a corresponding antenna port group or a maximum Code Rate.

In one embodiment, the N radio resource block sets are N PUCCH resource sets respectively, and the specific meaning of the PUCCH resource sets can be found in 3GPP TS38.213, section 9.2.1.

In one embodiment, the first information comprises a PUCCH-Config IE, and the specific meaning of the PUCCH-Config IE can be found in 3GPP TS38.331, section 6.3.2.

In one embodiment, the first information comprises a PUCCH-ResourceSet field in a PUCCH-Config IE, and the specific meaning of the PUCCH-Config IE and the PUCCH-ResourceSet field can be found in 3GPP TS38.331, section 6.3.2.

In one embodiment, the first signal comprises data.

In one embodiment, a channel for transmitting the first signal is a Downlink Shared Channel (DL-SCH).

In one embodiment, the first signal is transmitted on a downlink physical layer data channel (i.e., a downlink channel capable of carrying physical layer data).

In one embodiment, the downlink physical layer data channel is a Physical Downlink Shared CHannel (PDSCH).

In one embodiment, the downlink physical layer data channel is a short PDSCH (sPDSCH).

In one embodiment, the downlink physical layer data channel is a Narrow Band PDSCH (NB-PDSCH).

In one embodiment, the first signal carries a first bit block set, the first bit block set comprising a positive integer number of bit(s).

In one subembodiment, the first bit block set comprises a positive integer number of Transport Block(s) (TB(s)).

In one subembodiment, the first bit block set comprises one TB.

In one subembodiment, the first bit block set comprises a positive integer number of Code Block Group(s) (CBG(s)).

In one embodiment, the first signaling explicitly indicates scheduling information of the first signal.

In one embodiment, the first signaling implicitly indicates scheduling information of the first signal.

In one embodiment, the scheduling information of the first signal comprises at least one of a time-domain resource occupied, a frequency-domain resource occupied, a Modulation and Coding Scheme (MCS), configuration information of DeModulation Reference Signals (DMRS), a Hybrid Automatic Repeat reQuest (HARQ) process ID, a Redundancy Version (RV), a New Data Indicator (NDI), a transmission antenna port, or a corresponding Transmission Configuration Indicator (TCI) state.

In one subembodiment, the configuration information of the DMRS comprises at least one of a Reference Signal (RS) sequence, a mapping mode, a DMRS type, a time-domain resource occupied, a frequency-domain resource occupied, a code-domain resource occupied, a cyclic shift or an Orthogonal Cover Code (OCC).

In one embodiment, the first sub-bit-block comprises a HARQ-ACK for the first signal.

In one embodiment, the first sub-bit-block indicates whether each bit block in a first bit block set carried by the first signal is correctly received.

In one embodiment, the first sub-bit-block comprises a HARQ-ACK for the first bit block set carried by the first signal.

In one embodiment, the second signal comprises data.

In one embodiment, a channel for transmitting the second signal is a DL-SCH.

In one embodiment, the second signal is transmitted on a downlink physical layer data channel (i.e., a downlink channel capable of carrying physical layer data).

In one embodiment, the second signal carries a second bit block set, the second bit block set comprising a positive integer number of bit(s).

In one subembodiment, the second bit block set comprises a positive integer number of TB(s).

In one subembodiment, the second bit block set comprises one TB.

In one subembodiment, the second bit block set comprises a positive integer number of CBG(s).

In one embodiment, the second signaling explicitly indicates scheduling information of the second signal.

In one embodiment, the second signaling implicitly indicates scheduling information of the second signal.

In one embodiment, the scheduling information of the second signal comprises at least one of a time-domain resource occupied, a frequency-domain resource occupied, a Modulation and Coding Scheme (MCS), configuration information of DeModulation Reference Signals (DMRS), a Hybrid Automatic Repeat reQuest (HARQ) process ID, a Redundancy Version (RV), a New Data Indicator (NDI), a transmission antenna port, or a corresponding Transmission Configuration Indicator (TCI) state.

In one subembodiment, the configuration information of the DMRS comprises at least one of a Reference Signal (RS) sequence, a mapping mode, a DMRS type, a time-domain resource occupied, a frequency-domain resource occupied, a code-domain resource occupied, a cyclic shift or an Orthogonal Cover Code (OCC).

In one embodiment, the second sub-bit-block comprises a HARQ-ACK for the second signal.

In one embodiment, the second sub-bit-block indicates whether each bit block in a second bit block set carried by the second signal is correctly received.

In one embodiment, the second sub-bit-block comprises a HARQ-ACK for the second bit block set carried by the second signal.

Embodiment 6

Figure 6:
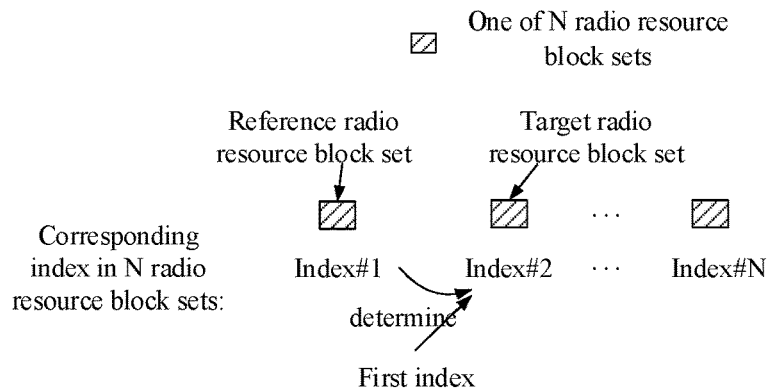
FIG. 6 illustrates a schematic diagram of determining a target radio resource block set according to one embodiment of the present disclosure.

Embodiment 6 illustrates a schematic diagram of determining a target radio resource block set, as shown in FIG. 6.

In Embodiment 6, the reference radio resource block set in the present disclosure is one of N radio resource block sets, and the target radio resource block set in the present disclosure is one of the N radio resource block sets, any of the N radio resource block sets comprising a positive integer number of radio resource block(s), N being a positive integer greater than 1; the first index and an index of the reference radio resource block set in the N radio resource block sets are used for determining an index of the target radio resource block set in the N radio resource block sets.

In one embodiment, the index of the target radio resource block set in the N radio resource block sets is equal to the index of the reference radio resource block set in the N radio resource block sets, the target radio resource block set being the reference radio resource block set.

In one embodiment, the index of the target radio resource block set in the N radio resource block sets is different from the index of the reference radio resource block set in the N radio resource block sets, the target radio resource block set being different from the reference radio resource block set.

In one embodiment, the index of the target radio resource block set in the N radio resource block sets is equal to a sum of the first index and the index of the reference radio resource block set in the N radio resource block sets.

In one embodiment, the index of the target radio resource block set in the N radio resource block sets is equal to a difference between the first index and the index of the reference radio resource block set in the N radio resource block sets.

In one embodiment, the N radio resource block sets respectively correspond to N indexes, a given radio resource block set is any radio resource block set of the N radio resource block sets, any given index is an index for the given radio resource block set out of the N indexes, and the given index is an index of the given radio resource block set in the N radio resource block sets.

In one subembodiment, the N indexes are 0, 1 . . . , and N−1, respectively.

In one subembodiment, the N indexes are 1, 2 . . . , and N, respectively.

In one embodiment, the N radio resource block sets respectively correspond to indexes 1, 2 . . . and N; a given radio resource block set is any one of the N radio resource block sets, and an index of the given radio resource block set in the N radio resource block sets is a positive integer greater than 0 and no greater than the N.

In one embodiment, the N radio resource block sets respectively correspond to indexes 0, 1 . . . and N−1; a given radio resource block set is any one of the N radio resource block sets, and an index of the given radio resource block set in the N radio resource block sets is a positive integer no less than 0 and less than the N.

In one embodiment, indexes of any two radio resource block sets of the N radio resource block sets are different in the N radio resource block sets.

Embodiment 7

Figure 7:
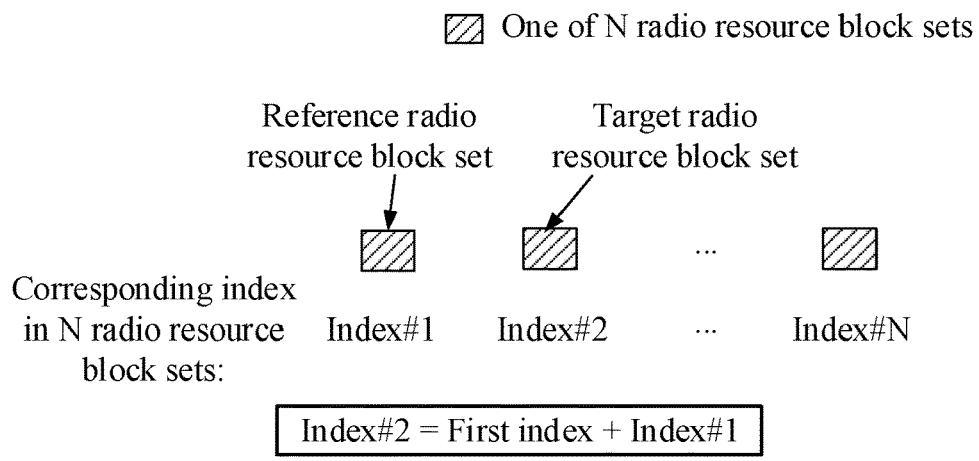
FIG. 7 illustrates a schematic diagram of determining an index of a target radio resource block set in N radio resource block sets according to one embodiment of the present disclosure.

Embodiment 7 illustrates a schematic diagram of determining an index of a target radio resource block set in N radio resource block sets, as shown in FIG. 7.

In Embodiment 7, the index of the target radio resource block set in the N radio resource block sets is equal to a sum of the first index in the present disclosure and the index of the reference radio resource block set in the N radio resource block sets in the present disclosure.

In one embodiment, the first index is equal to 0, the index of the target radio resource block set in the N radio resource block sets is equal to the index of the reference radio resource block set in the N radio resource block sets, the target radio resource block set being the reference radio resource block set.

In one subembodiment, the target radio resource block is the reference radio resource block.

In one embodiment, the index of the target radio resource block set in the N radio resource block sets is equal to a target index, and the target radio resource block set is one of the N radio resource block sets corresponding to the target index.

Embodiment 8

Figure 8:
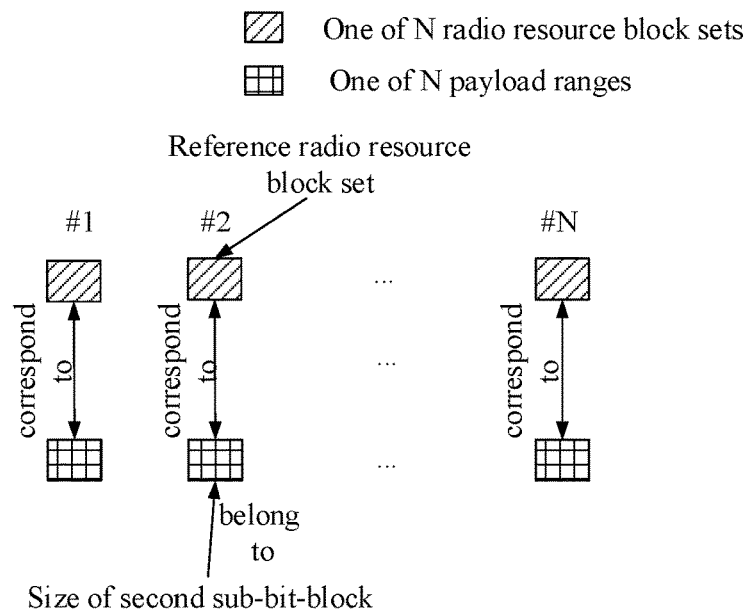
FIG. 8 illustrates a schematic diagram of determining a reference radio resource block set according to one embodiment of the present disclosure.

Embodiment 8 illustrates a schematic diagram of determining a reference radio resource block set, as shown in FIG. 8.

In Embodiment 8, the N radio resource block sets in the present disclosure respectively correspond to N payload ranges, any of the N payload ranges comprises a positive integer number of value(s), and any value comprised in the N payload ranges is a positive integer, any two payload ranges of the N payload ranges being orthogonal; the reference radio resource block set is one of the N radio resource block sets that corresponds to a payload range comprising the size of the second sub-bit-block in the present disclosure.

In one embodiment, the first signaling is used for indicating a first radio resource block, the first radio resource block being reserved for the first sub-bit-block; the first radio resource block is a radio resource block in the first radio resource block set, the first radio resource block set being one of the N radio resource block sets; size of the first sub-bit-block is used for determining the first radio resource block set.

In one embodiment, the first signaling is used for indicating a first radio resource block, the first radio resource block being reserved for the first sub-bit-block; the first radio resource block is a radio resource block in the first radio resource block set, the first radio resource block set being one of the N radio resource block sets that corresponds to a payload range comprising the size of the first sub-bit-block.

In one embodiment, any two of the N payload ranges are different from each other.

In one embodiment, any two of the N payload ranges do not comprise a same value.

In one embodiment, a k-th payload range of the N payload ranges is $(a_{k-1}, a_k]$, k=1, 2, ..., N; herein, $a_0, a_1, ..., a_N$ are non-negative integers, respectively.

In one subembodiment, $a_1, ..., a_{N-1}$ are configured by higher-layer signalings.

In one subembodiment, $a_0$ is pre-defined.

In one subembodiment, $a_N$ is pre-defined.

In one subembodiment, $a_0$ is configured by a higher-layer signaling.

In one subembodiment, $a_N$ is configured by a higher-layer signaling.

In one subembodiment, $a_1, ..., a_{N-1}$ are indicated by the first information.

In one subembodiment, $a_0$ is indicated by the first information.

In one subembodiment, $a_N$ is indicated by the first information.

In one embodiment, the N is equal to 4, and the N bit number ranges are [1, 2], (2, N2], (N2, N3] and (N3, 1706], respectively, N2 and N3 being configured by higher-layer signalings.

In one embodiment, the N is equal to 4, and the N bit number ranges are [1, 2], (2, N2], (N2, N3] and [N3, 1706], respectively, N2 and N3 being configured by higher-layer signalings.

Embodiment 9

Figure 9:
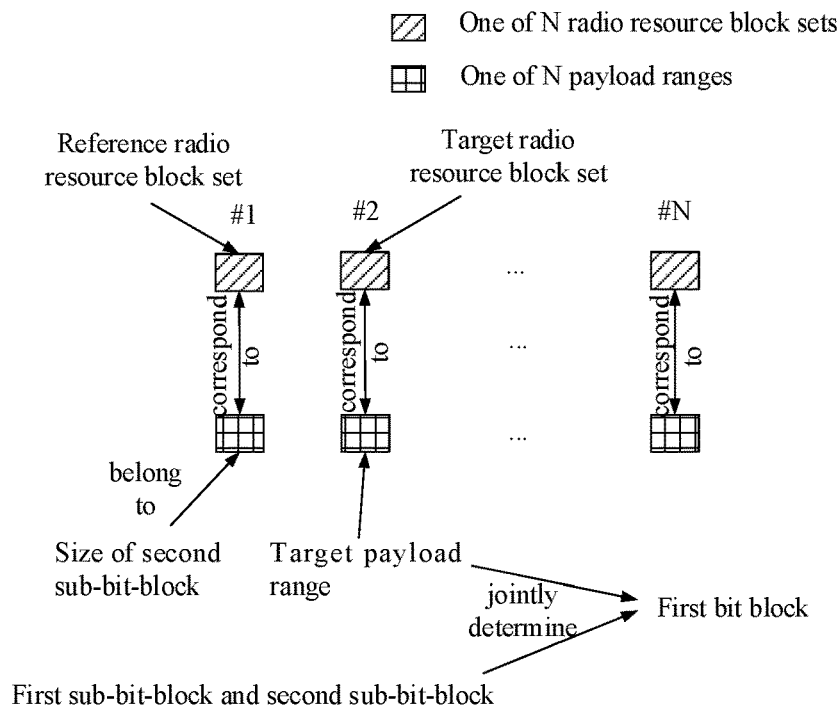
FIG. 9 illustrates a schematic diagram of determining a first bit block according to one embodiment of the present disclosure.

Embodiment 9 illustrates a schematic diagram of determining a first bit block, as shown in FIG. 9.

In Embodiment 9, the N radio resource block sets in the present disclosure respectively correspond to N payload ranges, any of the N payload ranges comprises a positive integer number of value(s), and any value comprised in the N payload ranges is a positive integer, any two payload ranges of the N payload ranges being orthogonal; the reference radio resource block set in the present disclosure is one of the N radio resource block sets that corresponds to a payload range comprising the size of the second sub-bit-block in the present disclosure; a target payload range is one of the N payload ranges that corresponds to the target radio resource block set in the present disclosure, size of the first bit block belonging to the target payload range; the first sub-bit-block, the second sub-bit-block and the target payload range are jointly used for determining the first bit block.

In one embodiment, how a sum of the size of the first sub-bit-block and the size of the second sub-bit-block relates to the target payload range is used for determining the size of the first bit block.

In one embodiment, how a sum of the size of the first sub-bit-block and the size of the second sub-bit-block relates to the target payload range is used for determining the first bit block.

In one embodiment, how a sum of the size of the first sub-bit-block and the size of the second sub-bit-block relates to the target payload range is used for determining how the first bit block relates to the first sub-bit-block and the second sub-bit-block.

In one embodiment, a sum of the size of the first sub-bit-block and the size of the second sub-bit-block belongs to the target payload range, the size of the first bit block being equal to the size of the first sub-bit-block and the size of the second sub-bit-block.

In one embodiment, a sum of the size of the first sub-bit-block and the size of the second sub-bit-block belongs to the target payload range, the first bit block comprising the first sub-bit-block and the second sub-bit-block.

In one embodiment, a sum of the size of the first sub-bit-block and the size of the second sub-bit-block is greater than a maximum value comprised in the target payload range, the size of the first bit block being smaller than the size of the first sub-bit-block and the size of the second sub-bit-block.

In one embodiment, a sum of the size of the first sub-bit-block and the size of the second sub-bit-block is greater than a maximum value comprised in the target payload range, and the size of the first bit block is equal to or less than the maximum value comprised by the target payload range.

In one embodiment, a sum of the size of the first sub-bit-block and the size of the second sub-bit-block is greater than a maximum value comprised in the target payload range, and the size of the first bit block is no greater than the maximum value comprised by the target payload range.

In one embodiment, a sum of the size of the first sub-bit-block and the size of the second sub-bit-block is greater than a maximum value comprised in the target payload range, the first bit block being composed of part of bits in the first sub-bit-block and the second sub-bit-block.

In one embodiment, a sum of the size of the first sub-bit-block and the size of the second sub-bit-block is greater than a maximum value comprised in the target payload range, the size of the first bit block being smaller than the size of the first sub-bit-block and the size of the second sub-bit-block, a second bit block comprises the first sub-bit-block and the second sub-bit-block, and the second bit block is used for generating the first bit block.

In one subembodiment, the first bit block is composed of part of bits comprised in the second bit block.

In one subembodiment, the first bit block is composed of the first M bit(s) comprised in the second bit block, M being a positive integer and equal to the size of the first bit block.

In one subembodiment, an order in which bits comprised in the second bit block are arranged is an order of sequence of input to an encoder.

In one subembodiment, an order in which bits comprised in the second bit block are arranged is a descending order of priorities.

In one subembodiment, an order in which bits comprised in the second bit block are arranged is an ascending order of corresponding indexes in the second bit block.

In one subembodiment, the first M bit(s) comprised in the second bit block is(are) M bit(s) of a highest priority in the second bit block.

In one subembodiment, the first M bit(s) comprised in the second bit block is(are) M bit(s) of a smallest index in the second bit block.

In one subembodiment, a first bit comprised in the second bit block corresponds to index 0.

In one subembodiment, a first bit comprised in the second bit block corresponds to index 1.

In one subembodiment, the first M bit(s) comprised in the second bit block corresponds (respectively correspond) to index(es) 0, 1 ..., and M−1.

In one subembodiment, the first M bit(s) comprised in the second bit block corresponds (respectively correspond) to index(es) 1, 2 ..., and M.

Embodiment 10

Figure 10:
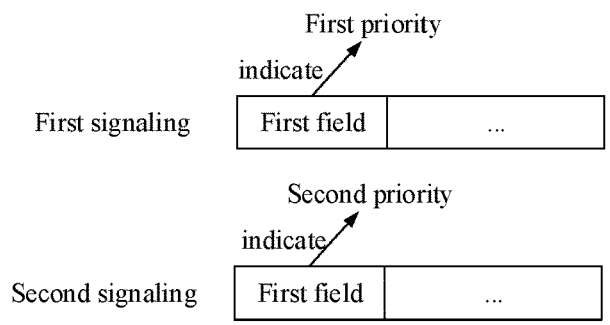
FIG. 10 illustrates a schematic diagram of a first priority and a second priority according to one embodiment of the present disclosure.

Embodiment 10 illustrates a schematic diagram of a first priority and a second priority, as shown in FIG. 10.

In Embodiment 10, both the first signaling and the second signaling in the present disclosure comprise a first field, the first field comprised in the first signaling indicates a first priority, while the first field comprised in the second signaling indicates a second priority, the first priority being different from the second priority.

In one embodiment, the first field comprises a positive integer number of bit(s).

In one embodiment, the first field comprises 1 bit.

In one embodiment, the first field is a Priority indicator Field, and the specific meaning of the Priority indicator Field can be found in 3GPP TS38.212, section 7.3.1.2.

In one embodiment, the second priority is higher than the first priority.

In one embodiment, a priority corresponding to the second priority is higher than that corresponding to the first priority.

In one embodiment, when a value of the first field is equal to 0, the first field indicates the first priority; when the value of the first field is equal to 1, the first field indicates the second priority.

In one embodiment, when a value of the first field is equal to 1, the first field indicates the first priority; when the value of the first field is equal to 0, the first field indicates the second priority.

In one embodiment, a higher-layer signaling is used for indicating that the first signaling and the second signaling both comprise the first field.

Embodiment 11

Figure 11:
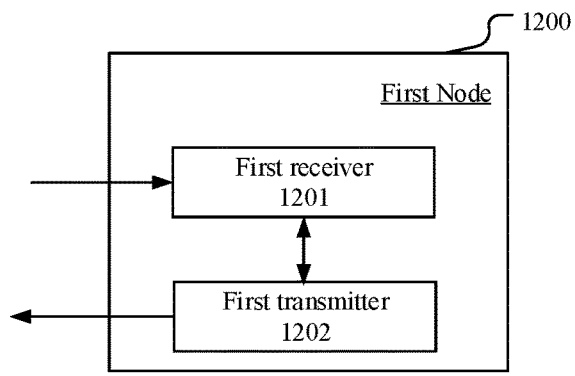
FIG. 11 illustrates a structure block diagram of a processing device in a first node according to one embodiment of the present disclosure.

Embodiment 11 illustrates a structure block diagram of a processing device in a first node, as shown in FIG. 11. In FIG. 11, a first node's processing device 1200 comprises a first receiver 1201 and a first transmitter 1202.

In one embodiment, the first node 1200 is a UE.

In one embodiment, the first node 1200 is a relay node.

In one embodiment, the first node 1200 is vehicle-mounted equipment.

In one embodiment, the first node 1200 is a UE supporting V2X communications.

In one embodiment, the first node 1200 is a relay node supporting V2X communications.

In one embodiment, the first receiver 1201 comprises at least one of at least one of the antenna 452, the receiver 454, the multi-antenna receiving processor 458, the receiving processor 456, the controller/processor 459, the memory 460 or the data source 467 in FIG. 4 of the present disclosure.

In one embodiment, the first receiver 1201 comprises at least the first five of at least one of the antenna 452, the receiver 454, the multi-antenna receiving processor 458, the receiving processor 456, the controller/processor 459, the memory 460 and the data source 467 in FIG. 4 of the present disclosure.

In one embodiment, the first receiver 1201 comprises at least the first four of at least one of the antenna 452, the receiver 454, the multi-antenna receiving processor 458, the receiving processor 456, the controller/processor 459, the memory 460 and the data source 467 in FIG. 4 of the present disclosure.

In one embodiment, the first receiver 1201 comprises at least the first three of at least one of the antenna 452, the receiver 454, the multi-antenna receiving processor 458, the receiving processor 456, the controller/processor 459, the memory 460 and the data source 467 in FIG. 4 of the present disclosure.

In one embodiment, the first receiver 1201 comprises at least the first two of at least one of the antenna 452, the receiver 454, the multi-antenna receiving processor 458, the receiving processor 456, the controller/processor 459, the memory 460 and the data source 467 in FIG. 4 of the present disclosure.

In one embodiment, the first transmitter 1202 comprises at least one of the antenna 452, the transmitter 454, the multi-antenna transmitting processor 457, the transmitting processor 468, the controller/processor 459, the memory 460 or the data source 467 in FIG. 4 of the present disclosure.

In one embodiment, the first transmitter 1202 comprises at least the first five of the antenna 452, the transmitter 454, the multi-antenna transmitting processor 457, the transmitting processor 468, the controller/processor 459, the memory 460 and the data source 467 in FIG. 4 of the present disclosure.

In one embodiment, the first transmitter 1202 comprises at least the first four of the antenna 452, the transmitter 454, the multi-antenna transmitting processor 457, the transmitting processor 468, the controller/processor 459, the memory 460 and the data source 467 in FIG. 4 of the present disclosure.

In one embodiment, the first transmitter 1202 comprises at least the first three of the antenna 452, the transmitter 454, the multi-antenna transmitting processor 457, the transmitting processor 468, the controller/processor 459, the memory 460 and the data source 467 in FIG. 4 of the present disclosure.

In one embodiment, the first transmitter 1202 comprises at least the first two of the antenna 452, the transmitter 454, the multi-antenna transmitting processor 457, the transmitting processor 468, the controller/processor 459, the memory 460 and the data source 467 in FIG. 4 of the present disclosure.

The first receiver 1201 receives a first signaling; and receives a second signaling.

The first transmitter 1202 transmits a first bit block in a target radio resource block.

In Embodiment 11, a first sub-bit-block and a second sub-bit-block are used for generating the first bit block, the first sub-bit-block being associated with the first signaling, and the second sub-bit-block being associated with the second signaling; the second signaling is used for indicating the target radio resource block from a target radio resource block set, the target radio resource block being a radio resource block in the target radio resource block set, and the target radio resource block set comprising a positive integer number of radio resource block(s); size of the second sub-bit-block is used for determining a reference radio resource block set, the reference radio resource block set comprising a positive integer number of radio resource block(s); the second signaling is used for indicating a first index, and the first index is used together with the reference radio resource block set for determining the target radio resource block set, the first index being an integer.

In one embodiment, the reference radio resource block set is one of N radio resource block sets, and the target radio resource block set is one of the N radio resource block sets, any of the N radio resource block sets comprising a positive integer number of radio resource block(s), N being a positive integer greater than 1; the first index and an index of the reference radio resource block set in the N radio resource block sets are used for determining an index of the target radio resource block set in the N radio resource block sets.

In one embodiment, the index of the target radio resource block set in the N radio resource block sets is equal to a sum of the first index and the index of the reference radio resource block set in the N radio resource block sets.

In one embodiment, the N radio resource block sets respectively correspond to N payload ranges, any of the N payload ranges comprises a positive integer number of value(s), and any value comprised in the N payload ranges is a positive integer, any two payload ranges of the N payload ranges being orthogonal; the reference radio resource block set is one of the N radio resource block sets that corresponds to a payload range comprising the size of the second sub-bit-block; a target payload range is one of the N payload ranges that corresponds to the target radio resource block set, and size of the first bit block belongs to the target payload range; the first sub-bit-block, the second sub-bit-block and the target payload range are jointly used for determining the first bit block.

In one embodiment, the first receiver 1201 also receives first information; herein, the first information is used for indicating the N radio resource block sets.

In one embodiment, both the first signaling and the second signaling in the present disclosure comprise a first field, the first field comprised in the first signaling indicates a first priority, while the first field comprised in the second signaling indicates a second priority, the first priority being different from the second priority.

In one embodiment, the first receiver 1201 also receives a first signal; and receives a second signal; herein, the first signaling is used for indicating scheduling information of the first signal, and the second signaling is used for indicating scheduling information of the second signal, the first sub-bit-block is used for determining whether the first signal is correctly received, and the second sub-bit-block is used for determining whether the second signal is correctly received.

Embodiment 12

Figure 12:
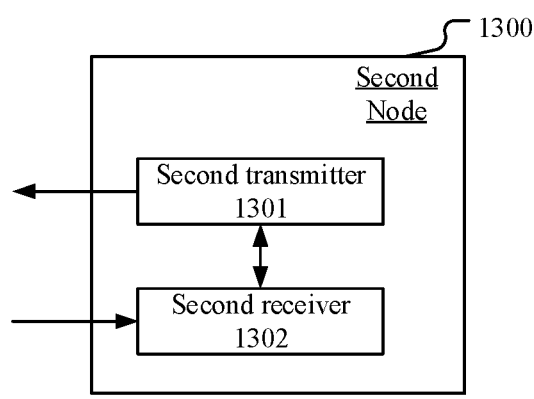
FIG. 12 illustrates a structure block diagram of a processing device in a second node according to one embodiment of the present disclosure.

Embodiment 12 illustrates a structure block diagram of a processing device in a second node, as shown in FIG. 12. In FIG. 12, a second node's processing device 1300 comprises a second transmitter 1301 and a second receiver 1302.

In one embodiment, the second node 1300 is a UE.

In one embodiment, the second node 1300 is a base station.

In one embodiment, the second node 1300 is a relay node.

In one embodiment, the second transmitter 1301 comprises at least one of the antenna 420, the transmitter 418, the multi-antenna transmitting processor 471, the transmitting processor 416, the controller/processor 475 or the memory 476 in FIG. 4 of the present disclosure.

In one embodiment, the second transmitter 1301 comprises at least the first five of the antenna 420, the transmitter 418, the multi-antenna transmitting processor 471, the transmitting processor 416, the controller/processor 475 and the memory 476 in FIG. 4 of the present disclosure.

In one embodiment, the second transmitter 1301 comprises at least the first four of the antenna 420, the transmitter 418, the multi-antenna transmitting processor 471, the transmitting processor 416, the controller/processor 475 and the memory 476 in FIG. 4 of the present disclosure.

In one embodiment, the second transmitter 1301 comprises at least the first three of the antenna 420, the transmitter 418, the multi-antenna transmitting processor 471, the transmitting processor 416, the controller/processor 475 and the memory 476 in FIG. 4 of the present disclosure.

In one embodiment, the second transmitter 1301 comprises at least the first two of the antenna 420, the transmitter 418, the multi-antenna transmitting processor 471, the transmitting processor 416, the controller/processor 475 and the memory 476 in FIG. 4 of the present disclosure.

In one embodiment, the second receiver 1302 comprises at least one of the antenna 420, the receiver 418, the multi-antenna receiving processor 472, the receiving processor 470, the controller/processor 475 or the memory 476 in FIG. 4 of the present disclosure.

In one embodiment, the second receiver 1302 comprises at least the first five of the antenna 420, the receiver 418, the multi-antenna receiving processor 472, the receiving processor 470, the controller/processor 475 and the memory 476 in FIG. 4 of the present disclosure.

In one embodiment, the second receiver 1302 comprises at least the first four of the antenna 420, the receiver 418, the multi-antenna receiving processor 472, the receiving processor 470, the controller/processor 475 and the memory 476 in FIG. 4 of the present disclosure.

In one embodiment, the second receiver 1302 comprises at least the first three of the antenna 420, the receiver 418, the multi-antenna receiving processor 472, the receiving processor 470, the controller/processor 475 and the memory 476 in FIG. 4 of the present disclosure.

In one embodiment, the second receiver 1302 comprises at least the first two of the antenna 420, the receiver 418, the multi-antenna receiving processor 472, the receiving processor 470, the controller/processor 475 and the memory 476 in FIG. 4 of the present disclosure.

The second transmitter 1301 transmits a first signaling; and transmits a second signaling.

The second receiver 1302 receives a first bit block in a target radio resource block.

In Embodiment 12, a first sub-bit-block and a second sub-bit-block are used for generating the first bit block, the first sub-bit-block being associated with the first signaling, and the second sub-bit-block being associated with the second signaling; the second signaling is used for indicating the target radio resource block from a target radio resource block set, the target radio resource block being a radio resource block in the target radio resource block set, and the target radio resource block set comprising a positive integer number of radio resource block(s); size of the second sub-bit-block is used for determining a reference radio resource block set, the reference radio resource block set comprising a positive integer number of radio resource block(s); the second signaling is used for indicating a first index, and the first index is used together with the reference radio resource block set for determining the target radio resource block set, the first index being an integer.

In one embodiment, the reference radio resource block set is one of N radio resource block sets, and the target radio resource block set is one of the N radio resource block sets, any of the N radio resource block sets comprising a positive integer number of radio resource block(s), N being a positive integer greater than 1; the first index and an index of the reference radio resource block set in the N radio resource block sets are used for determining an index of the target radio resource block set in the N radio resource block sets.

In one embodiment, the index of the target radio resource block set in the N radio resource block sets is equal to a sum of the first index and the index of the reference radio resource block set in the N radio resource block sets.

In one embodiment, the N radio resource block sets respectively correspond to N payload ranges, any of the N payload ranges comprises a positive integer number of value(s), and any value comprised in the N payload ranges is a positive integer, any two payload ranges of the N payload ranges being orthogonal; the reference radio resource block set is one of the N radio resource block sets that corresponds to a payload range comprising the size of the second sub-bit-block; a target payload range is one of the N payload ranges that corresponds to the target radio resource block set, and size of the first bit block belongs to the target payload range; the first sub-bit-block, the second sub-bit-block and the target payload range are jointly used for determining the first bit block.

In one embodiment, the second transmitter 1301 also transmits first information; herein, the first information is used for indicating the N radio resource block sets.

In one embodiment, both the first signaling and the second signaling in the present disclosure comprise a first field, the first field comprised in the first signaling indicates a first priority, while the first field comprised in the second signaling indicates a second priority, the first priority being different from the second priority.

In one embodiment, the second transmitter 1301 also transmits a first signal; and transmits a second signal; herein, the first signaling is used for indicating scheduling information of the first signal, and the second signaling is used for indicating scheduling information of the second signal, the first sub-bit-block is used for determining whether the first signal is correctly received, and the second sub-bit-block is used for determining whether the second signal is correctly received.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The first node includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts, etc. The second node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts, etc. The base station or network-side equipment includes but is not limited to macro-cellular base stations, micro-cellular base stations, home base stations, relay base station, eNB, gNB, Transmitter Receiver Point (TRP), GNSS, relay satellite, satellite base station, airborne base station and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:
1. A first node for wireless communications, comprising:
a first receiver, receiving a first signaling; and receiving a second signaling; and a first transmitter, transmitting a first bit block in a target radio resource block;
wherein a first sub-bit-block and a second sub-bit-block are used for generating the first bit block, the first sub-bit-block being associated with the first signaling, and the second sub-bit-block being associated with the second signaling; the second signaling is used for indicating the target radio resource block from a target radio resource block set, the target radio resource block being a radio resource block in the target radio resource block set, and the target radio resource block set comprising a positive integer number of radio resource block(s); size of the second sub-bit-block is used for determining a reference radio resource block set, the reference radio resource block set comprising a positive integer number of radio resource block(s); the second signaling is used for indicating a first index, and the first index is used together with the reference radio resource block set for determining the target radio resource block set, the first index being an integer.

2. The first node according to claim 1, wherein the reference radio resource block set is one of N radio resource block sets, and the target radio resource block set is one of the N radio resource block sets, any of the N radio resource block sets comprising a positive integer number of radio resource block(s), N being a positive integer greater than 1; the first index and an index of the reference radio resource block set in the N radio resource block sets are used for determining an index of the target radio resource block set in the N radio resource block sets.

3. The first node according to claim 2, wherein the index of the target radio resource block set in the N radio resource block sets is equal to a sum of the first index and the index of the reference radio resource block set in the N radio resource block sets.

4. The first node according to claim 2, wherein the N radio resource block sets respectively correspond to N payload ranges, any of the N payload ranges comprises a positive integer number of value(s), and any value comprised in the N payload ranges is a positive integer, any two payload ranges of the N payload ranges being orthogonal; the reference radio resource block set is one of the N radio resource block sets that corresponds to a payload range comprising the size of the second sub-bit-block; a target payload range is one of the N payload ranges that corresponds to the target radio resource block set, and size of the first bit block belongs to the target payload range; the first sub-bit-block, the second sub-bit-block and the target payload range are jointly used for determining the first bit block.

5. The first node according to claim 1, wherein both the first signaling and the second signaling comprise a first field, the first field comprised in the first signaling indicates a first priority, and the first field comprised in the second signaling indicates a second priority, the first priority being different from the second priority.

6. A second node for wireless communications, comprising:
a second transmitter, transmitting a first signaling; and transmitting a second signaling; and
a second receiver, receiving a first bit block in a target radio resource block;
wherein a first sub-bit-block and a second sub-bit-block are used for generating the first bit block, the first sub-bit-block being associated with the first signaling, and the second sub-bit-block being associated with the second signaling; the second signaling is used for indicating the target radio resource block from a target radio resource block set, the target radio resource block being a radio resource block in the target radio resource block set, and the target radio resource block set comprising a positive integer number of radio resource block(s); size of the second sub-bit-block is used for determining a reference radio resource block set, the reference radio resource block set comprising a positive integer number of radio resource block(s); the second signaling is used for indicating a first index, and the first index is used together with the reference radio resource block set for determining the target radio resource block set, the first index being an integer.

7. The second node according to claim 6, wherein the reference radio resource block set is one of N radio resource block sets, and the target radio resource block set is one of the N radio resource block sets, any of the N radio resource block sets comprising a positive integer number of radio resource block(s), N being a positive integer greater than 1; the first index and an index of the reference radio resource block set in the N radio resource block sets are used for determining an index of the target radio resource block set in the N radio resource block sets.

8. The second node according to claim 7, wherein the index of the target radio resource block set in the N radio resource block sets is equal to a sum of the first index and the index of the reference radio resource block set in the N radio resource block sets.

9. The second node according to claim 7, wherein the N radio resource block sets respectively correspond to N payload ranges, any of the N payload ranges comprises a positive integer number of value(s), and any value comprised in the N payload ranges is a positive integer, any two payload ranges of the N payload ranges being orthogonal; the reference radio resource block set is one of the N radio resource block sets that corresponds to a payload range comprising the size of the second sub-bit-block; a target payload range is one of the N payload ranges that corresponds to the target radio resource block set, and size of the first bit block belongs to the target payload range; the first sub-bit-block, the second sub-bit-block and the target payload range are jointly used for determining the first bit block.

10. The second node according to claim 6, wherein both the first signaling and the second signaling comprise a first field, the first field comprised in the first signaling indicates a first priority, and the first field comprised in the second signaling indicates a second priority, the first priority being different from the second priority.

11. A method in a first node for wireless communications, comprising:
receiving a first signaling;
receiving a second signaling; and
transmitting a first bit block in a target radio resource block;
wherein a first sub-bit-block and a second sub-bit-block are used for generating the first bit block, the first sub-bit-block being associated with the first signaling, and the second sub-bit-block being associated with the second signaling; the second signaling is used for indicating the target radio resource block from a target radio resource block set, the target radio resource block being a radio resource block in the target radio resource block set, and the target radio resource block set comprising a positive integer number of radio resource block(s); size of the second sub-bit-block is used for determining a reference radio resource block set, the reference radio resource block set comprising a positive integer number of radio resource block(s); the second signaling is used for indicating a first index, and the first index is used together with the reference radio resource block set for determining the target radio resource block set, the first index being an integer.

12. The method according to claim 11, wherein the reference radio resource block set is one of N radio resource block sets, and the target radio resource block set is one of the N radio resource block sets, any of the N radio resource block sets comprising a positive integer number of radio resource block(s), N being a positive integer greater than 1; the first index and an index of the reference radio resource block set in the N radio resource block sets are used for determining an index of the target radio resource block set in the N radio resource block sets.

13. The method according to claim 12, wherein the index of the target radio resource block set in the N radio resource block sets is equal to a sum of the first index and the index of the reference radio resource block set in the N radio resource block sets.

14. The method according to claim 12, wherein the N radio resource block sets respectively correspond to N payload ranges, any of the N payload ranges comprises a positive integer number of value(s), and any value comprised in the N payload ranges is a positive integer, any two payload ranges of the N payload ranges being orthogonal; the reference radio resource block set is one of the N radio resource block sets that corresponds to a payload range comprising the size of the second sub-bit-block; a target payload range is one of the N payload ranges that corresponds to the target radio resource block set, and size of the first bit block belongs to the target payload range; the first sub-bit-block, the second sub-bit-block and the target payload range are jointly used for determining the first bit block.

15. The method according to claim 11, wherein both the first signaling and the second signaling comprise a first field, the first field comprised in the first signaling indicates a first priority, and the first field comprised in the second signaling indicates a second priority, the first priority being different from the second priority.

16. A method in a second node for wireless communications, comprising:
transmitting a first signaling;
transmitting a second signaling; and
receiving a first bit block in a target radio resource block;
wherein a first sub-bit-block and a second sub-bit-block are used for generating the first bit block, the first sub-bit-block being associated with the first signaling, and the second sub-bit-block being associated with the second signaling; the second signaling is used for indicating the target radio resource block from a target radio resource block set, the target radio resource block being a radio resource block in the target radio resource block set, and the target radio resource block set comprising a positive integer number of radio resource block(s); size of the second sub-bit-block is used for determining a reference radio resource block set, the reference radio resource block set comprising a positive integer number of radio resource block(s); the second signaling is used for indicating a first index, and the first index is used together with the reference radio resource block set for determining the target radio resource block set, the first index being an integer.

17. The method according to claim 16, wherein the reference radio resource block set is one of N radio resource block sets, and the target radio resource block set is one of the N radio resource block sets, any of the N radio resource block sets comprising a positive integer number of radio resource block(s), N being a positive integer greater than 1; the first index and an index of the reference radio resource block set in the N radio resource block sets are used for determining an index of the target radio resource block set in the N radio resource block sets.

18. The method according to claim 17, wherein the index of the target radio resource block set in the N radio resource block sets is equal to a sum of the first index and the index of the reference radio resource block set in the N radio resource block sets.

19. The method according to claim 17, wherein the N radio resource block sets respectively correspond to N payload ranges, any of the N payload ranges comprises a positive integer number of value(s), and any value comprised in the N payload ranges is a positive integer, any two payload ranges of the N payload ranges being orthogonal; the reference radio resource block set is one of the N radio resource block sets that corresponds to a payload range comprising the size of the second sub-bit-block; a target payload range is one of the N payload ranges that corresponds to the target radio resource block set, and size of the first bit block belongs to the target payload range; the first sub-bit-block, the second sub-bit-block and the target payload range are jointly used for determining the first bit block.

20. The method according to claim 16, wherein both the first signaling and the second signaling comprise a first field, the first field comprised in the first signaling indicates a first priority, and the first field comprised in the second signaling indicates a second priority, the first priority being different from the second priority.

* * * * *